(12) United States Patent
Skeem et al.

(10) Patent No.: US 6,817,936 B1
(45) Date of Patent: Nov. 16, 2004

(54) METAL SINGLE LAYER ABRASIVE CUTTING TOOL HAVING A CONTOURED CUTTING SURFACE

(75) Inventors: Marcus R. Skeem, Northbridge, MA (US); Sergej-Tomislav Buljan, Acton, MA (US); Jean Kramp, Rumelange (LU)

(73) Assignee: Saint-Gobain Abrasives Technology Company, Worcester, MA (US)

( * ) Notice: Subject to any disclaimer, the term of this patent is extended or adjusted under 35 U.S.C. 154(b) by 1286 days.

(21) Appl. No.: 08/892,836

(22) Filed: Jul. 15, 1997

Related U.S. Application Data

(63) Continuation of application No. 08/616,538, filed on Mar. 15, 1996, now abandoned.

(51) Int. Cl.⁷ ................................................. B24D 7/00
(52) U.S. Cl. ...................... 451/547; 451/28; 125/13.01; 30/347
(58) Field of Search ........................... 228/122.1, 124.5; 451/541, 542, 544, 548; 125/13.01, 13.02, 16.01, 20, 22, 15

(56) References Cited

U.S. PATENT DOCUMENTS

| 2,811,960 A | 11/1957 | Fessel | ......................... 125/15 |
| 3,016,661 A | 1/1962 | Nielsen | ....................... 51/206 |

(List continued on next page.)

FOREIGN PATENT DOCUMENTS

| DE | 65385 | 1/1892 | |
| EP | 0090274 | 9/1988 | ............ B24D/7/00 |
| EP | 688623 A1 | 12/1995 | ............ B23F/21/03 |
| JP | 57033969 | 2/1982 | ............ B24D/5/12 |
| JP | 57184674 | 11/1982 | ............ B24D/5/12 |
| JP | 61-293770 | 12/1986 | ............ B24D/5/12 |
| SU | 329025 | 4/1972 | ............ B28D/1/12 |
| WO | 9201542 | 2/1992 | ............ B28D/1/12 |

Primary Examiner—George Nguyen
(74) Attorney, Agent, or Firm—Mary E. Porter

(57) ABSTRACT

This invention relates to a method of cutting, comprising the steps of:
  a) providing an abrasive cutting tool comprising:
    i) a substrate surface having a plurality of teeth extending therefrom, and
    ii) a single layer of abrasive grains chemically bonded to at least a portion of each tooth to define a plurality of cutting levels parallel to the substrate surface, the cutting levels comprising a first uppermost cutting level and a second uppermost cutting level, the grains having a predetermined concentration, size and toughness,
  b) moving the substrate surface in an intended direction of rotation,
  c) contacting the uppermost cutting level of at least one tooth to a workpiece at a point of contact,
  d) applying a constant force to the tool directed at the point of contact,
wherein the constant force is sufficient to cut the workpiece, the strength of the bond is sufficient to resist peeling, the predetermined concentration, size and toughness of the plurality of grains are such that the grains of the uppermost cutting level fracture under application of the constant force, and the hardness and thickness of the teeth are such that the portion of each tooth associated with the first uppermost cutting level abrades at about the same rate as the grains of the first uppermost cutting level fracture, thereby causing essentially simultaneous removal of the grains of the first uppermost cutting level from their bond and abrasion of the portion of each tooth associated with the first uppermost cutting level, and
grains of the second uppermost cutting level to the worpiece.

31 Claims, 1 Drawing Sheet

U.S. PATENT DOCUMENTS

| | | | |
|---|---|---|---|
| 3,028,710 A | 4/1962 | Pratt | 51/206 |
| 3,049,843 A | 8/1962 | Christensen | 51/206 |
| 3,128,755 A | 4/1964 | Benson | 125/15 |
| 3,178,273 A | 4/1965 | Libal | 51/293 |
| 3,338,230 A | 8/1967 | Lindblad | 125/15 |
| 3,436,871 A | 4/1969 | Schneider et al. | |
| 3,495,359 A | 2/1970 | Smith et al. | |
| 3,513,821 A | 5/1970 | Bouvier | 125/15 |
| 3,678,568 A * | 7/1972 | Knippenberg et al. | 228/124.5 |
| 3,863,401 A | 2/1975 | Schwarzkopf | 51/206.4 |
| 4,050,956 A * | 9/1977 | De Bruin et al. | 228/124.5 |
| 4,114,322 A | 9/1978 | Greenspan | |
| 4,461,268 A | 7/1984 | Inoue | 125/15 |
| 4,637,370 A * | 1/1987 | Ishizuka | 125/15 |
| 4,665,887 A * | 5/1987 | Shiga | 125/15 |
| 4,844,323 A * | 7/1989 | Kondo et al. | 228/124.5 |
| 4,860,722 A | 8/1989 | Veglio | 125/15 |
| 4,883,500 A | 11/1989 | Deakins et al. | 51/298 |
| 5,018,276 A * | 5/1991 | Asada | 451/541 |
| 5,062,865 A | 11/1991 | Chen et al. | |
| 5,146,909 A | 9/1992 | Ruark et al. | 125/11.01 |
| 5,215,072 A * | 6/1993 | Scott | 125/21 |
| 5,340,012 A * | 8/1994 | Beeferman | 228/124.5 |
| 5,392,759 A | 2/1995 | Kwang | 125/15 |
| 5,429,199 A | 7/1995 | Sheirer et al. | 175/321 |
| 5,433,187 A | 7/1995 | Hayasaka et al. | 125/15 |
| 5,441,033 A | 8/1995 | Chiuminatta | 125/15 |
| 5,443,418 A * | 8/1995 | Frodin et al. | 451/541 |

\* cited by examiner

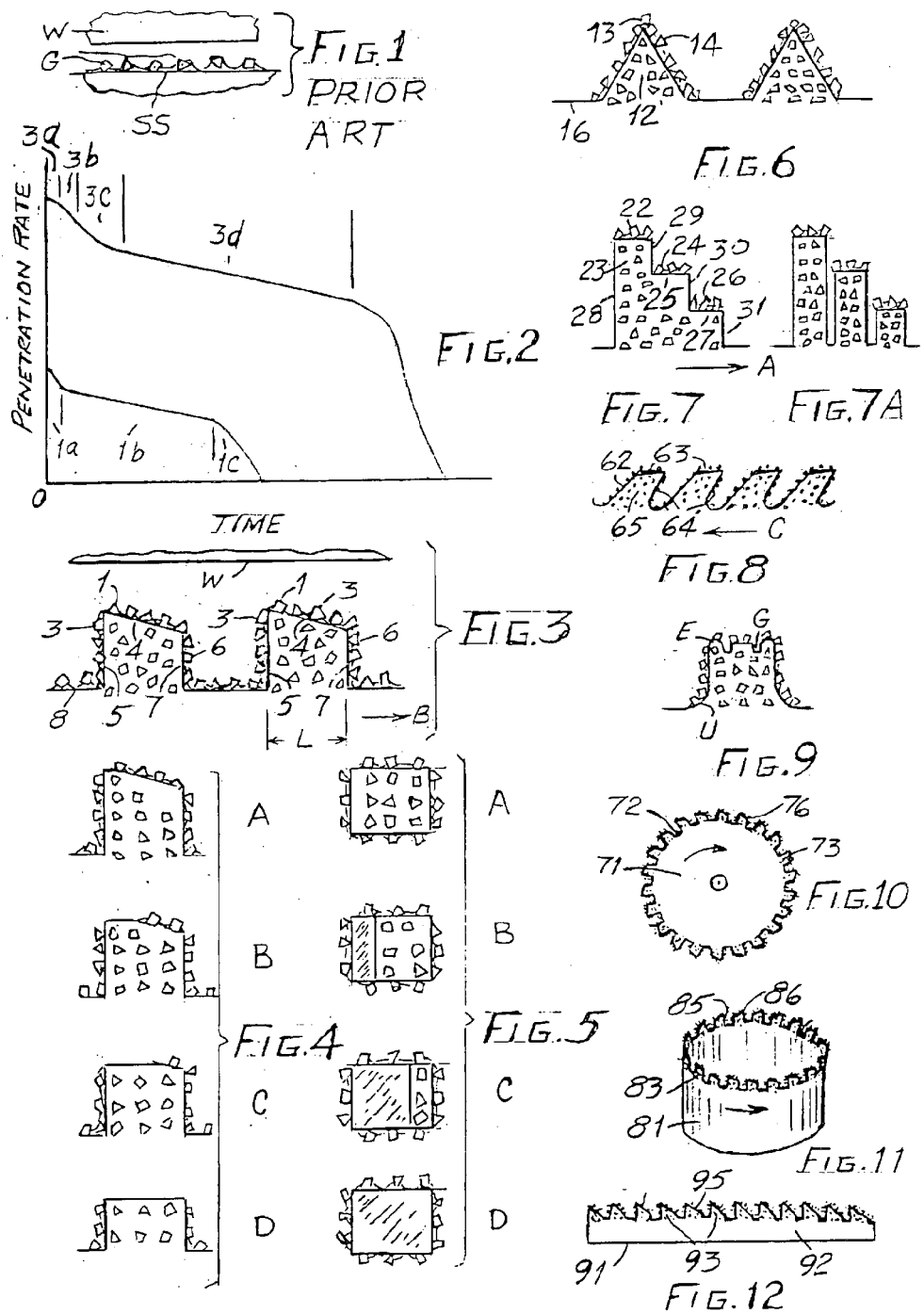

METAL SINGLE LAYER ABRASIVE CUTTING TOOL HAVING A CONTOURED CUTTING SURFACE

This application is a continuation of application Ser. No. 08/616,538, filed Mar. 15, 1996, now abandoned.

BACKGROUND OF THE INVENTION

Superhard abrasive cutting tools fitted with saw blades, core bits and cutting wheels for use in construction applications are typically classified as either metal matrix bonded (MB) or as metal single layer (SL). The SL cutting tool has a single layer of abrasive grain (or "grit") bonded to a smooth metal substrate by a minimum of bond material so that the abrasive grit is essentially exposed on the cutting surface of the tool. When the cutting surface is presented to the workpiece to be cut, substantially only the abrasive grit contacts the workpiece. Since a substantial portion of the load of the tool is carried by the abrasive grit, the load on each cutting point of the grit is very high. This condition produces high penetration rates and high cutting rates. However, since the SL tool has only a single layer of abrasive, it can no longer effectively cut once that layer is dulled during operation.

The MB tool increases tool life by increasing the number of layers of abrasive grit on the cutting surface. The typical MB tool is made by forming segments of an abrasive-containing metal matrix and attaching those segments to the periphery of a steel substrate. Because abrasive grit is dispersed throughout the segments, the MB cutting tool surface remains effective after the uppermost abrasive grains dull and are removed. Accordingly, MB tools generally have a longer life than SL tools. However, since the abrasive grit is embedded in a metal matrix, both the metal matrix and the abrasive grit are exposed on the tool periphery. When the MB tool is presented to the workpiece, both the abrasive grit and the metal matrix contact the workpiece, thereby lowering the load on each cutting point of the grit (as compared to an SL tool) and producing lower penetration rates and lower cutting rates.

Some metal single layer tools having teeth are known in the art. In one tool, rectangular teeth are provided on the edge of a core drill, and a single metal layer of abrasive grains are bonded to the teeth. During use, the uppermost grains on the teeth cut the workpiece. However, the large size, high concentration and low toughness of the grains are such that these uppermost grains quickly dull when cutting hard surfaces such as masonry, and the penetration rate of the tool quickly falls to zero.

In another tool, angled teeth are provided on the cutting surface of a grinding wheel, and a single metal layer of abrasive grains is electroplated to the teeth. During use, the uppermost grains on the teeth cut the workpiece. However, the weak mechanical nature of the electroplate bond results in the lower levels of grains being peeled from the tooth. Accordingly, the usefulness of the tool is limited to the usefulness of the uppermost layer of grains.

Therefore, it is an object of the present invention to provide a cutting tool having the high penetration rate characteristic of an SL tool and the long life characteristic of an MB tool.

SUMMARY OF THE INVENTION

In accordance with the present invention, there is provided an abrasive cutting tool comprising:
  a) a substrate surface having a plurality of teeth extending therefrom, each tooth having a surface, and
  b) a layer comprising abrasive grains, the layer being chemically bonded to at least a portion of the surface of each tooth to define a plurality of cutting levels parallel to the substrate surface,
wherein the grains have a relative strength index of at least one minute, as measured by the FEPA standard for measuring the relative strength of saw diamonds.

Also in accordance with the present invention, there is provided a method of cutting, comprising the steps of:
  a) providing an abrasive cutting tool comprising:
    i) a substrate surface having a plurality of teeth extending therefrom, each tooth having a surface, and
    ii) a layer comprising abrasive grains, the layer being chemically bonded to at least a portion of the surface of each tooth to define a plurality of cutting levels parallel to the substrate surface, the cutting levels comprising a first uppermost cutting level and a second uppermost cutting level, the grains having a predetermined wear resistance,
  b) moving the substrate surface in an intended direction of rotation,
  c) contacting the uppermost cutting level of at least one tooth to a workpiece at a point of contact,
  d) applying a constant force to the tool directed at the point of contact,
wherein the constant force is sufficient to cut the workpiece, the strength of the bond is sufficient to resist peeling, the predetermined wear resistance of the grains is such that the grains of the first uppermost cutting level fracture under application of the constant force, and the wear resistance of the teeth are such that the portion of the tooth associated with the first uppermost cutting level wears at about the same rate as the grains of the first uppermost cutting level fracture,
thereby causing essentially simultaneous removal of the grains of the first uppermost cutting level from their bond and the portion of the tooth associated with the first uppermost cutting level, and
thereby exposing the grains of the second uppermost cutting level to the workpiece.

Also in accordance with the present invention, there is provided an abrasive cutting tool comprising:
  a) a substrate surface having a plurality of teeth extending therefrom, each tooth having a surface and
  b) a layer comprising abrasive grains, the layer being chemically bonded to at least a portion of the surface of each tooth to define a plurality of cutting levels parallel to the substrate surface,
wherein the substrate surface has an intended direction of movement, wherein the plurality of teeth includes successive teeth having successively lower uppermost cutting levels in the direction of the intended direction of movement, thereby producing a cutting surface having a negative angle of inclination with respect to the intended direction of movement.

Also in accordance with the present invention, there is provided an abrasive cutting tool comprising:
  a) a substrate surface having a plurality of teeth extending therefrom, each tooth having a surface, and
  b) a layer comprising abrasive grains, the layer being chemically bonded to at least a portion of the surface of each tooth to define a plurality of cutting levels parallel to the substrate surface,
wherein the substrate surface has an intended direction of movement, wherein at least a portion of each tooth has a face which is inclined at a negative angle with respect to the intended direction of movement, and at least a portion of the grains are bonded to the face having the negative angle of inclination.

Also in accordance with the present invention, there is provided an abrasive cutting tool comprising:

a) a substrate surface having a plurality of teeth extending therefrom, the teeth having a surface and a predetermined wear resistance, and b) a layer comprising abrasive grains, the layer being chemically bonded to at least a portion of the surface of each tooth to define a plurality of cutting levels parallel to the substrate surface, the grains having a predetermined wear resistance, wherein the wear resistance of the teeth and the wear resistance of the grains are predetermined such that, when a given cutting level contacts a workpiece under an optimum load, the grains of the given cutting level wear and fracture at about the same rate as the portion of the tooth associated with the given cutting level wears away.

DESCRIPTION OF THE FIGURES

FIG. 1 shows the flat surface of a conventional SL tool.

FIG. 2 compares the time dependence of penetration rate for a conventional SL core drill with that of one embodiment of the present invention.

FIG. 3 shows one embodiment of the present invention wherein the teeth have a trapezoidal shape.

FIGS. 4 and 5 show the changing shape of the FIG. 3 embodiment during use, from a side and top view respectively.

FIG. 6 shows one embodiment of the present invention in which the teeth have a triangular shape.

FIG. 7 shows one embodiment of the present invention in which each tooth comprises a plurality of projections extending from the base to different heights.

FIGS. 8 and 9 show two preferred embodiments of the teeth of the present invention.

FIGS. 10, 11 and 12 show embodiments of the present invention wherein the substrate is a wheel, core bit and blade, respectively.

DETAILED DESCRIPTION OF THE INVENTION

For the purposes of the present invention, the "cutting surface" of a tooth is considered to be the grains which are bonded to the tooth. A specific "cutting level" of a tooth of the grains which are bonded to the tooth at the same distance from the substrate surface. Similarly, a specific "cutting level" of a tool are all of the grains which are bonded to the tool at the same distance from the substrate surface. The "uppermost" cutting level is that which is farthest away from the substrate surface. The portion of a tooth which is "associated" with a specific cutting level is that slice of the tooth which is positioned at the same distance from the substrate surface as the specified cutting level. A plurality of cutting levels having "about the same number of grains" are those whose number of grains are between about 80% and 120% of the mean number of grains for those levels. The "concentration" of grit on a tooth is determined relative to the theoretical hexagonal close packing of spheres.

It has been found that when a) the surface of a cutting tool is contoured with teeth which allow a plurality of cutting levels to be formed, b) the grains bonded to the tooth surface have a predetermined wear resistance which leads to failure by fracture rather than dulling, c) the bond between the grain and teeth is strong enough to resist peeling, and d) the tooth wear resistance is predetermined to match the grain wear resistance so that the tooth wears away at about the same rate the grains wear and fracture, the resultant tool possesses advantages not found in the prior art tools. In particular, the tool of the present invention has a longer life and a higher penetration rate than the both the conventional flat rimmed SL tool and the SL tools having teeth.

The longer life of the present invention is attributed to its ability to continually provide fresh, sharp abrasive at the leading edge of each tooth as the cutting proceeds. See, for example, FIG. 3. When the tool is presented to the workpiece so that the substrate surface 8 is parallel to the workpiece surface, the angled (i.e., non-parallel) face 4 of the cutting surface produces a similarly angled orientation with respect to the workpiece surface. Since this portion of the cutting surface is now angled towards the workpiece surface, only the first uppermost cutting level contacts the workpiece, thereby becoming the leading edge. As the grains of the first uppermost cutting level cut the workpiece, then fracture and fall away before they significantly dull. At the same time, the portion of the tooth associated with the first uppermost cutting level is made of material which abrades away at about the same rate as the first uppermost cutting level, thereby exposing the fresh, sharp abrasive grains 3 of the second uppermost cutting level. This process repeats itself as each successively lower cutting level of grains ringing the tooth becomes the leading edge, cuts, dulls a bit, falls away and, upon simultaneous abrasion of the portion of the tooth associated with that cutting level, exposes the fresh cutting level beneath it. Accordingly, it is believed that the present invention is the first SL tool to provide fresh cutting levels of abrasive grain during use.

Moreover, since only a portion of the grains on the cutting surface contacts the workpiece at any one time, the load per grain is much higher than that found in a conventional flat rimmed SL tool having the same amount of grain, leading to even higher penetration rates.

Further advantages of the present invention are best understood by contrasting its penetration rate profile (over time) with that of a conventional (or "continuous rim") SL core bit. In a continuous rim SL tool, as shown in FIG. 1, the substrate surface SS is essentially smooth and the grains G bonded thereto contact the workpiece W during each cutting period. The initial penetration rate of this tool, denoted by the Region 1A in FIG. 2, is somewhat high because the irregularity of the grain shapes produce few initial contact points. Soon afterwards, those initial contact points dull and essentially all of the grains on the tool can contact the workpiece. However, because there are so many grains contacting the workpiece at any one time, the lower load per grain limits the cutting rate. As the grains dull, their cutting efficiency falls and the penetration rate falls (Region 1B). Eventually, the grains dull to the point of polishing (Region 1C), and the tool's usefulness has been spent.

In one embodiment of the SL tool of the present invention, as exemplified by the trapezoid tooth design shown in FIG. 3, only the grains 1 at the first uppermost cutting level of the tooth 2 initially contact the workpiece W. Since these grains are sharp, their contact produces a very high initial penetration rate, as denoted by Region 3 A in FIG. 2. As cutting proceeds, these grains dull and the penetration rate falls slightly. However, before they dull significantly, these grains fracture and fall away, thus exposing the portion of the tooth associated with the uppermost cutting level. When that portion of the tooth is removed by the abrasive action the workpiece, the grains of the second uppermost cutting level 3 on both the sloped portion 4 of the tooth and the four sides of the tooth (such as side 5) become exposed to the workpiece. Since these grains of the second uppermost cutting level are still sharp, they cut very efficiently. However, there are many more grains at this cutting level and a portion of the substrate now contacts the workpiece, thus distributing the tool's load over a wider area. Accordingly, the load per grain is somewhat lessened and the penetration rate, as denoted by Region 3B of FIG. 2, falls slightly. As the leading edge travels still farther down the tooth, the load per contacting grain steadily decreases as the area of the tooth contacting the workpiece and the number of grains in the cutting level contacting the workpiece both increase. Consequently, the penetration rate falls still farther (region 3C). When the leading edge reaches the grains 6 bonded to the right side of the tooth 7, both the horizontal cross-sectional area of the tooth and the number of grains contacting the workpiece stop increasing. Accordingly, the load per grain stabilizes and the penetration rate reaches a steady state condition (region 3D). The steady state condition continues until the leading edge reaches the bottom of the tooth.

Because the steady state cutting condition is desirable, in preferred embodiments, at least about 50% (and more preferably at least about 75%) of the cutting levels have about the same number of grains. In some embodiments, this steady state region exists in each tooth. In some embodiments, a steady state region (i.e., successive cutting levels having about the same number of grains) is present in at least the lowermost 50% of the tooth.

FIGS. 4 and 5 display the change in the condition of the tooth and cutting levels during use, as viewed from the side of the tooth and from the perspective of the workpiece, respectively, wherein the hatched regions of FIGS. 5b–5d represent the portion of the tooth in contact with the workpiece. FIGS. 4a and 5a correspond to region 3a; FIGS. 4b and 5b correspond to region 3b, etc.

The trapezoidal tooth embodiment is preferred for two reasons. First, the sloped face 4 of the tooth restricts initial workpiece contact to the few grains at the first uppermost cutting level, and restricts subsequent contact to only a minimum of grains and tooth area at lower cutting levels on the face. This condition provides a very high initial cutting rate (regions 3a–3c of FIG. 2) which is important for creating an initial cut in a workpiece. Second, at the lowest cutting levels, the normal disposition of the tooth sides 5 and 7 guarantee that the number of grains and the area of the substrate in contact with the workpiece remains constant for the duration of the operation. This condition produces a long steady state condition (Region 3D of FIG. 2) of a significant penetration rate, wherein working grains are simply replaced by fresh grains before they significantly dull. This is important in operations where extended reliability is needed.

In preferred embodiments having trapezoidal teeth, at least the uppermost 10% of the cutting surface of each tooth comprises a face disposed at an angle of between about 5 and 60 degrees relative to the surface substrate. More preferably, the lowest 50% of each tooth has a constant cross sectional area parallel to the substrate surface.

Although the trapezoidal shape of the tooth of FIG. 3 provides particular advantages, the shape of the tooth can be any shape which provides for gradual presentation of fresh abrasive grain to the workpiece as the abrasive grains which have been in contact with the workpiece fracture and fall away before they dull. For example, the triangular shaped tooth of FIG. 6 is also considered an embodiment of the present invention. In this embodiment, the cutting tool comprises a substrate surface 16 and a series of triangular teeth 12 extending from the surface. In this case, only the grains at the uppermost cutting level 13 (those bonded to the top of each tooth 12) contact the workpiece W, thereby defining the leading edge. As those grains are worn away, fresh grains 14 (those at the second uppermost cutting level) become the leading edge. In its initial stages, the penetration behavior of this tooth would be relatively similar to that of the trapezoidal tooth of FIG. 3 (Regions 3a–3c of FIG. 2), but with the triangular tooth contact area expanding less rapidly than that of the trapezoid (given equal base lengths L and grain loads), leading to higher initial penetration rates. In the later stages of the triangular tooth's life, however, the tooth area contacting the workpiece continues to grow, as does the number of grains contacting the workpiece. Accordingly, a steady state condition is not reached and the penetration rate falls off much quicker. Although all of the grains in FIG. 6 are bonded to teeth, the substrate surface 16 may also have grains brazed thereon.

In other embodiments, as in FIG. 7, each tooth comprises a series of projections extending step-like to different lengths from the base of the substrate surface. In this embodiment, the grains 22 bonded to the top of the tallest projection 23 constitute the uppermost cutting level and uniformly contact the workpiece 27 at the beginning of the operation, and as these grains 22 are worn away, fresh grains 24 bonded to a slightly shorter projection 25 become the leading edge of the cutting surface. This process is repeated as grains 26 on projection 27 becoming the leading edge. Accordingly, the collective grains 22, 24 and 26 are considered to constitute a single cutting surface disposed at an angle to the substrate surface. Similarly, a large number of thin, closely spaced, successively shorter teeth (as shown in FIG. 7a) function essentially equivalently to those in FIG. 7.

Another feature of the teeth of FIG. 7 is that the abrasive grains are applied only to selected faces of each tooth. In this embodiment, the grains 22 at the top of the face 23 constitute the leading edge which contacts the workpiece 20. The vertical faces 28–31 of the tooth do not have any grain bonded to them. In operation, this tool moves in the left to right direction against a workpiece (as signified by arrow A) to produce a negative rake.

It is anticipated that, in some applications, the grains at the leading edge of a sharply sloping face will be susceptible to undercutting. Undercutting occurs when a sharp grain in contact with the workpiece is prematurely removed because swarf has removed the underlying bond. Therefore, in some embodiments, the tool is designed to have at least one cutting surface 4 which slopes downward toward the substrate surface 8 at an angle of between about 5 and 35 degrees, and the tool is moved across a workpiece W in a direction of negative rake (as signified by arrow B). Under these conditions, the grains 3 of the second uppermost cutting level are sufficiently close to the grains 1 of the first uppermost cutting level to physically protect the integrity of the bond to the grains 1 of the first uppermost cutting level from the swarf, thereby preventing the undercutting of those grains 1. The preferred angle for preventing undercutting appears to be independent of grain size, but varies with the concentration. When the concentration of the abrasive grain is about 100%, the angle required for protection is between about 26 and about 32 degrees. When the concentration of the abrasive grain is about 50%, the angle required for protection is between about 14 and about 17 degrees. When the concentration of the abrasive grain is about 25%, the angle required for protection is between about 9 and about 11 degrees. When the concentration of the abrasive grain is about 12%, the angle required for protection is between about 5 and about 7 degrees. In other words, the angle of protection should be no more than about 1 degree for every three percentage points of grain concentration.

In other embodiments, the tooth has a shape as shown in FIG. 8. This tooth 65 comprises an angled portion 62 which rises at an angle of about 45 degrees on one side, a flat top 63, and a descending portion 64 on the back side. Moving the tooth across a workpiece in the direction of arrow C provides the desired negative rake condition.

In other embodiments, the tooth has a contour as shown in FIG. 9. The tooth is rounded at its junction with the substrate surface (U) and at the upper most ends (E). The teeth also have radial grooves (G). The rounded edges provide the uppermost grains with protection from undercutting, while the radial grooves provide space for an additional level of abrasive grain which will become the leading edge when the uppermost grains fracture and fall away.

Since a conventional SL wheel heats up to between about 80 C and 100 C during use and undergoes significant thermal expansion, expansion gaps, or "gullets", are often designed into the perimeter of the wheel. For example, on a typical 12 inch diameter wheel, these gaps are about 1/16 inches wide, about 1/4 inches in height, are spaced about 2 inches apart, typically comprise no more than 5% of the circular perimeter and sometimes have abrasive grain adhering to their bottoms and sides. However, these gaps are completely different than the spaces between the teeth of the present invention, as there are so many grains on the long flat of a conventional SL wheel there is effectively only one cutting level, and the lower load per grain at that cutting level merely dulls and does not fracture the grains of that cutting level.

In preferred embodiments, the cutting surface of the present invention typically comprises an angled face comprising at least 30% of the cutting levels, preferably between 75% and 100%. Although not required, it is also preferable that the angled face include the uppermost 10% of the cutting levels. It is still more preferable that the angled face comprise at least 50% and most preferably at least 75% of the uppermost cutting levels on the tooth.

The teeth of the present invention are typically spaced so that their base lengths L (as in FIG. 3) constitute at least about 10% of the substrate surface, preferably between about 30% and 60%. When the bases comprise less than 10%, the teeth are mechanically weak and prone to bending and breakage.

Typical teeth materials include fiber reinforced plastics, steel, and other appropriate materials having a structural strength of between 20 Rc and 70 Rc. However, in preferred embodiments, the grains and teeth are particularly designed to wear at about the same rate. The wear resistance of any material is determined by its hardness and fracture toughness, and increasing either factor increases the wear resistance of the material. In the case of the layer of the present invention, the wear resistance is generally determined by the wear resistance of the grains. In grains such as diamond or cubic boron nitride, the hardness of the material can not be significantly varied so the grain's fracture toughness is typically the feature which is varied. One common measure of the fracture toughness of a grain is its relative strength index, as measured by the FEPA standard for measuring the relative strength of saw diamonds. In general, grains having a relative strength index of at least one minute are desired. If the tooth of the present invention is made of a material other than a metal, then the hardness or fracture toughness of the material can be varied in order to match the wear resistance rates. In the case of the teeth of the present invention being made of a metal such as steel, the fracture toughness is already very high and so the hardness of the metal is varied in order to provide the matching wear rate. In one particularly preferred embodiment, the tooth is made of a metal (preferably a steel) having a hardness of between 38 R and 42 Ra while the grain (preferably a diamond) has a relative strength index of at least one minute. Core drilling tools of the present invention having a tooth hardness of 38–42 Ra (such as mild steel) were observed to effectively cut a broad range of building materials including cured concrete, concrete block, and dense limestone block.

Effective replenishment of grains via the exposure of lower cutting levels may also depend upon the aggressiveness of the workpiece. If the teeth are too soft or too hard, the effectiveness of the tool can easily be significantly reduced by 50% or more. Teeth having a hardness of about 50 Ra were ineffective in cutting limestone, as the limestone could not abrade the harder steel quickly enough to expose sharp new grit at lower cutting levels. Therefore, when the workpiece is hard and non-abrasive, the teeth preferably have a hardness of about 28 Ra. Conversely, teeth having a hardness of about 28 Ra were ineffective in drilling concrete block, as the concrete block abraded the softer teeth too rapidly, thereby removing grit which were still sharp. Therefore, when the workpiece is soft and abrasive, the teeth preferably have a hardness of about 64 Rc. In the cases of both the too-hard teeth and the too-soft teeth, the tool life was less than 50% of the life of the tooth having the hardness of between 38 Ra and 42 Ra.

Because the total area of the grain contact points determines the normal stress at the point of contact with the workpiece and hence the cutting rate, factors such as tooth thickness, and grain size, concentration and toughness also are important factors.

The present invention can use any abrasive grains which have the correct size, concentration and toughness to produce failure by fracture rather than dulling. Typically, the abrasive has a grain size of less than 1000 um, preferably between 100 um and 600 um, and is typically present in a concentration of less than 75%. In preferred embodiments, superabrasives such as diamond grit and cubic boron nitride and boron suboxide are used, typically in grain sizes found on conventional SL wheels. When diamond is used, it typically has a grain size of between about 100 and 1000 um and is present in a concentration of about 50%. When cubic boron nitride is used, it typically has grain size of between about 100 and 500 un, and is present in a concentration of about 50%. In general, when the material to be cut is very hard (i.e. has a Knoop hardness of over 700 Rc), a tough, strong abrasive having a relative strength index of at least 1 minute (as measured by the FEPA standard for measuring the relative strength of saw diamonds) is selected. Other conventional abrasives such as seeded sol gel alumina and silicon carbide may also be desirable in selected applications.

In one preferred embodiment, each tooth has a trapezoidal configuration with a top length of about 1.5 mm, a bottom length of about 6.5 mm, a width of about 2 mm, a height of about 2.8 mm, and has an angled face having an angle of about −45 degrees. The diamond's FEPA size designation is 501 and the relative strength index is about 1.38 minutes (3300 cycles), as measured by the FEPA standard for measuring the relative strength of saw diamonds. The diamond grit concentration is about 50%, or about 0.03 g/cm 2, and is bonded by a bronze titanium bond to teeth made of a steel having a hardness of 38–42 Ra.

It is believed some brazes used in conventional SL tools can be used in accordance with the present invention. Typical brazes include nickel alloys such as Ni—Cr alloys, and reactive brazes such as bronze-titanium brazes. The braze must provide a chemical bond which is strong enough to resist the simultaneous peeling of lower cutting levels when an upper cutting level is removed during grinding. In some instances, the abrasive grains can be coated with a metal such as titanium or tungsten for better adherence to the braze.

The SL tool of the present invention can be advantageously used to cut any workpieces having a Knoop hardness of at least 500 and which have been conventionally cut by diamond-laden tools, in particular, inorganic materials such as glass, tile, concrete and composites having hard dispersoids. It is especially desirable in masonry applications where the workpiece is selected from the group consisting of brick, such as lime-silica, cement block, and concrete, such as cured concrete. It may be use d to cut ceramic refractories such as alumina, silicon carbide and silicon nitride. It may also be used in cutting softer materials like plastics and composites.

In many hand-drilling applications involving tools of the present invention, the contact between the surface of the workpiece and the cutting surfaces of the tool carries a load of no more than about 30 to 40 pounds.

The present invention can be used in typical SL configurations, including wheels, core bits and flat blades. Therefore, in accordance with FIG. 10, there is provided an abrasive cutting wheel comprising:
  i) a circular disc 71 having a substrate surface 72 land a plurality of teeth 73 extending from the substrate surface, and
  ii) a single layer of abrasive grains 76 chemically bonded to the perimeter of each tooth to define a cutting surface on each tooth.

When used in a cutting wheel operation, the disc is typically made of steel and has a diameter of between about 4 and about 40 inches; for a ten inch blade, the teeth are preferably of a trapezoidal shape, total about 20 to 90 in number, have a height of about 0.02 to 0.20 inches, a width of about 0.02 to 1.2 inches, and a thickness of about 0.02 to 0.12 inches; the abrasive is typically diamond in the size range of 500 um, preferably between about 450 and 650 un having a relative strength index of at least one minute, and in a concentration of about 0.01 to 0.08 g/cm 2; the workpiece is typically concrete or masonry; and the teeth move along the workpiece in negative rake.

In accordance with FIG. 11, there is provided an abrasive core drill comprising:
  i) a barrel 81 comprising a plurality of teeth 83 extending therefrom, and
  ii) a single layer of abrasive grains 85 chemically bonded to the teeth to define a cutting surface 86 on each tooth.

When used in a core drill operation, the barrel is typically made of steel and has a diameter of between about 1 and about 6 inches; the projections are preferably of trapezoid shape, total about 10 to 60 in number, have a height of about 0.05 to 0.3 inches, a width of about 0.1 to 0.5 inches and a thickness of about 0.04 to 0.12 inches; the abrasive is typically diamond in the size range of 500 um, preferably between about 430 and 540 um, having a relative strength index of at least one minute, and in a concentration of about 0.01 to 0.08 g/cm 2; the workpiece is typically masonry or concrete; and the teeth move along the workpiece in negative rake.

The SL core drill of the present invention is completely different than the prior art steel hole saw blade discussed above having teeth covered with abrasive, as these hole saw blades typically use much larger, much weaker abrasives in much greater concentrations (i.e., typically on the order of 100%) and are used at very high applied loads to cut very soft materials such as wood or plastics. In conventional use of this type of hole saw, the grains on the leading edge of this tool do not fracture and fall away during grinding, but only dull. Since the grain size, toughness and grain concentration prevent grain replenishment at the leading edge, this conventional hole saw in no way suggests the advantages found in the present invention.

In accordance with FIG. 12, there is provided an abrasive blade comprising:
  i) a blade 91 having a linear substrate surface 92 and a plurality of teeth 93 extending from the linear substrate surface, and
  ii) a single layer of abrasive grains 95 bonded to each tooth to define a cutting surface on each tooth, When used in a blade operation, the blade is typically made of steel and has a length of between about 3 and about 9 inches; the projections are preferably of trapezoid shape, total about 10 to 100 in number, have a height of about 0.05 to 0.25 inches, a width of about 0.05 to 0.12 inches, and a thickness of about 0.05 to 0.15 inches; the abrasive is typically diamond in the size range of 300 to 600 um, preferably between about 300 and 500 um, having a relative strength index of at least one minute, and in a concentration of about 0.01 and 0.08 g/cm 2; the workpiece is typically light concrete or cinder block; and the teeth move along the workpiece in a condition of negative rake.

Comparative Example I

This test examined the behavior of holes saws having flat rims. Two 2.5 inch diameter hole saws having flat rims we re selected as the starting substrates. Bronze-titanium braze paste was applied to the rim, covered with about 1000 mg of diamond abrasive to produce an abrasive concentration of about 100%, and the braze was melted by conventional vacuum furnacing.

One of the tools so made contained 35/40 SDA 100+ diamond abrasive. Cutting was undertaken by hand drilling at 1500 rpm with a load of 30–40 pounds. This tool drilled only about 20 two-inch holes through heavy weight concrete block ("HCB") before the diamond was dulled and the cutting rate fell below about 2 cm/min.

Comparative Example II

This test examined the behavior of hole saws having conventional MB segments. Three MB segments containing diamond were affixed to a core drill substantially similar to that of Comparative Example I.

These tools were tested under conditions substantially similar to those of Comparative Example I, and drilled an average of 400 cm through HCB at an average of 5.3 cm/min.

Comparative Example III

This test examined the behavior of a conventional hole saw having essentially rectangular teeth to which low toughness, large sized grain were affixed in a concentration of about 100%. These tools were tested under conditions substantially similar to those of Comparative Example I, and drilled an average of only 3 cm before the cutting fell below 2 cm/min.

EXAMPLE I

In this embodiment, core drills of the present invention were made using 66 mm diameter outlet bits having a 2 mm wall thickness and made of 1020 steel having a 38–42 Ra hardness. The contour of the cutting surface was substantially similar to that shown in FIG. 9.

The crown of the bit was contoured by turning a 1 mm radius onto the leading edge of the steel substrate and then milling nine 0.050 inch wide slots spaced equally around the periphery. This procedure produced nine 0.402 inch wide, 0.200 high teeth. Two equally spaced radial grooves (0.0625 inches wide, 0.0625 inches deep) were then ground into the face of each tooth. A 0.035 inch layer of bronze titanium was then applied to the teeth and a layer of 35/40 SDA 100+ diamond (about 450 mg) was applied to the braze surface and the resulting assembly was placed in a vacuum furnace for conventional braze curing.

Bits made in accordance with this example were used to hand drill heavy weight concrete HCB blocks. After about 120–140 inches of drilling, the diamond on the face of the teeth was worn away. However, the bits continued to cut an acceptable rate (about 5 cm/min) because of the diamond positioned in the grooves of the teeth and on the peripheral faces of the teeth. These bits drilled another 60–80 inches of concrete after the uppermost diamond wore away. The total depth of cut was about 180–220 inches, or 490–560 cm.

EXAMPLE II

In this embodiment, tools of the present invention were made using 66 mm diameter outlet bits having a 2 mm wall thickness and made of 1020 steel having a 38–42 Ra hardness. The contour of the cutting surface was substantially similar to that shown in FIG. 8.

A single layer of abrasive grain consisting essentially of 0.5 g of 35\40 mesh SDA 100+ diamond and bronze-titanium braze was applied to the contour of each bit.

These bits were use to drill holes in HCB blocks. Initial penetration rates were about 3–4 inches a minute. Although the diamond on the leading edge of the contour was worn away after only a few holes, the bits continued to drill over four meters of concrete block. When the tests were suspended after each bit drilled 80 holes, the bits were still drilling at an acceptable rate of about 1.5–2 inches (3.8–5 cm) per minute. Drilling power varied between about 350 and 550 watts over the course of the test, while specific energy varied between about 0.30 and 0.75 J/mm3. When testing resumed, the average life was found to be 194 holes, or about 988 cm. The average speed was 6.7 cm/sec and the average power was about 414 W. Drilling was ended when then penetration fell below 2.5 cm/min or the bit wore out. Therefore, the tool having pointed teeth produces superior results.

EXAMPLE III

This test examined the behavior of a hole saw having a reversed tooth orientation. The tooth configuration in this case was similar to that of Example II, except that the angle of orientation was reversed so that the descending portion of the tooth was the leading edge, thereby producing-positive rake. These tools were tested under conditions substantially similar to those of Example I. After drilling only 5 cm, the teeth were so worn that only 20% of the height of the tooth remained. (In contrast, this level of wear was found in the teeth of Example II only after a full 400 cm of drilling.) This tool drilled for 396 cm before the penetration rate fell below 2.5 cm/min and had an average penetration rate of 5.4 cm/min. Accordingly, the tool having teeth oriented for a negative rake produces superior results.

The results of the above tests are summarized in Table I.

TABLE I

| TEST | Distance Drilled (cm) | Speed (cm/min) |
|---|---|---|
| C.E. I | 100 | — |
| C.E. II | 400 | 5.3 |
| C.E. III | 003 | — |
| E. I | 490–560 | 5 |
| E. II | 988 | 6.7 |
| E. III | 396 | 5.4 |

We claim:
1. An abrasive cutting tool comprising:
 a) a monolithic substrate having a substrate surface with a plurality of teeth extending therefrom, each tooth having a contoured surface,
 b) a layer comprising superabasive grains, the layer being chemically bonded to at least a portion of the surface of each tooth to define a plurality of cutting levels parallel to the substrate surface, and each cutting level on each tooth being oriented such that a portion of each cutting level overlaps at least a portion of each other cutting level of the tooth; and
 c) a first uppermost cutting level consisting of chemically bonded superabrasive grains and having no associated tooth portion, and successive uppermost cutting levels, comprising chemically bonded superabrasive grains and a portion of the tooth, among the plurality of cutting levels of each tooth;
 whereby after the first uppermost cutting level has been worn away by cutting a workpiece, each successive uppermost cutting level of the tooth presents to the workpiece a ring of superabrasive grain around the contoured surface of the tooth, and substantially all superabrasive grain within the ring simultaneously engages in cutting.

2. The tool of claim 1 wherein the substrate surface has an intended direction of movement, wherein at least a portion of each tooth has a face which is inclined at a negative angle with respect to the intended direction of movement, and at least a portion of the grains are bonded to the face having the negative angle of inclination.

3. The tool of claim 2 wherein the grains bonded to the face having the negative angle of inclination are present in a concentration wherein the angle of inclination in degrees is no more than ⅓ of the grain concentration in percent.

4. The tool of claim 1 comprising successive cutting levels comprising at least 50% of the plurality of cutting levels, wherein each cutting level of the successive cutting levels contains about the same number of grains.

5. The tool of claim 1 wherein a portion of each tooth is associated with successive cutting levels comprising at least 50% of the cutting levels of the tooth, and wherein each cutting level of the successive cutting levels contains about the same number of grains.

6. The tool of claim 5 wherein the portion of each tooth associated with the successive cutting levels having about the same number of grains has a constant cross section.

7. The tool of claim 5 wherein the portion of each tooth associated with the successive cutting levels having about the same number of grains has an uppermost cross section and a lowermost cross section, and the uppermost cross section is smaller than the lowermost cross section.

8. The tool of claim 5 wherein the successive cutting levels having about the same number of grains comprise at least the lowermost 50% of the cutting levels of each tooth.

9. The tool of claim 8 wherein the substrate surface has an intended direction of movement, wherein at least the uppermost 10% of each tooth has a face which is inclined at a negative angle with respect to the intended direction of movement, and at least a portion of the grains are bonded to the face having the negative angle of inclination, thereby producing a trapezoidal cutting surface.

10. The tool of claim 1 wherein the concentration of the grain is less than 75%.

11. The tool of claim 1 wherein the teeth have a hardness of between about 38 and 42 Ra.

12. A method of cutting, comprising the steps of:
a) providing an abrasive cutting tool comprising:
  i) a substrate surface having a plurality of teeth extending therefrom, each tooth having a surface, and
  ii) a layer comprising abrasive grains, the layer being chemically bonded to at least a portion of the surface of each tooth to define a plurality of cutting levels parallel to the substrate surface, the cutting levels comprising a first uppermost cutting level, consisting of chemically bonded superabrasive grains and having no associated tooth portion, and a second uppermost cutting level, comprising chemically bonded abrasive grains and a portion of the tooth, the grains having a predetermined wear resistance,
b) moving the substrate surface in an intended direction of rotation,
c) contacting the uppermost cutting level of at least one tooth to a workpiece at a point of contact,
d) applying a constant force to the tool directed at the point of contact, wherein the constant force is sufficient to cut the workpiece, the strength of the bond is sufficient to resist peeling, the predetermined wear resistance of the grains is such that the grains of the first uppermost cutting level fracture under application of the constant force, and the wear resistance of the teeth are such that the portion of the tooth associated with the first uppermost cutting level wears at about the same rate as the grains of the first uppermost cutting level fracture,
thereby causing essentially simultaneous removal of the grains of the first uppermost cutting level from their bond and the portion of the tooth associated with the first uppermost cutting level, and thereby exposing the grains of the second uppermost cutting level to the workpiece.

13. The method of claim 12 wherein at least a portion of each tooth has a face which is inclined at a negative angle with respect to the intended direction of movement, and at least a portion of the grains are bonded to the face having the negative angle of inclination.

14. The method of claim 13 wherein workpiece produces abrasive swarf when cut, and wherein the grains bonded to the face having the negative angle of inclination are present in a concentration wherein the angle of inclination in degrees is no more than ⅓ of the grain concentration in percent, thereby protecting the grains of the uppermost cutting level from undercutting.

15. The method of claim 12 comprising successive cutting levels comprising at least 50% of the plurality of cutting levels, wherein each cutting level of the successive cutting levels contains about the same number of grains.

16. The method of claim 15 wherein a portion of each tooth is associated with successive cutting levels comprising at least 50% of the cutting levels of the tooth, and wherein each cutting level of the successive cutting levels contains about the same number of grains.

17. The method of claim 16 wherein the portion of each tooth associated with the successive cutting levels having about the same number of grains has a constant cross section.

18. The method of claim 16 wherein the portion of each tooth associated with the successive cutting levels having about the same number of grains has an uppermost cross section and a lowermost cross section, and the uppermost cross section is smaller than the lowermost cross section.

19. The method of claim 12 wherein the grain toughness is characterized by a relative strength index of at least one minute, as measured by the FEPA standard for measuring the relative strength of saw diamonds.

20. The method of claim 12 wherein the grain size is between about 100 um and 600 um.

21. The method of claim 16 wherein the successive cutting levels having about the same number of grains comprise at least the lowermost 50% of the cutting levels of each tooth.

22. The method of claim 12 wherein the concentration of the grain is less than 75%.

23. The method of claim 12 wherein the workpiece is masonry having a Knoop hardness of at least 700 Rc.

24. The method of claim 12 wherein the teeth have a hardness of between 38 Ra and 42 Ra.

25. An abrasive cutting tool comprising:
a) a monolithic substrate having a substrate surface with a plurality of teeth extending therefrom, each tooth having a contoured surface,
b) a layer comprising abrasive grains, the layer being chemically bonded to at least a portion of the surface of each tooth to define a plurality of cutting levels parallel to the substrate surface, and each cutting level on each tooth being oriented such that a portion of each cutting level overlaps at least a portion of each other cutting level of the tooth; and
c) a first uppermost cutting level and successive uppermost cutting levels comprising superabrasive grains among the plurality of cutting levels of each tooth;
wherein the substrate surface has an intended direction of movement, wherein at least a portion of each tooth has a face which is inclined at a negative angle with respect to the intended direction of movement, and at least a portion of the abrasive grains are bonded to the face having the negative angle of inclination, and whereby after the first uppermost cutting level has been worn away by cutting a workpiece, each successive uppermost cutting level of the tooth presents to the workpiece a ring of superabrasive grain around the contoured surface of the tooth, and substantially all superabrasive grain within the ring simultaneously engages in cutting.

26. The tool of claim 25 wherein at least the uppermost 10% of each tooth comprises the face which is inclined at a negative angle with respect to the intended direction of movement.

27. An abrasive cutting tool comprising:
a) a substrate surface having a plurality of teeth extending therefrom, the teeth having a surface and a predetermined wear resistance, and
b) a layer comprising abrasive grains, the layer being chemically bonded to at least a portion of the surface of each tooth to define a plurality of cutting levels parallel to the substrate surface, the cutting levels comprising a first uppermost cutting level consisting of chemically bonded superabrasive grains and having no associated tooth portion, and the grains having a predetermined wear resistance, wherein the wear resistance of the teeth and the wear resistance of the grains are predetermined such that, when a given cutting level contacts a workpiece under an optimum load, the grains of the given cutting level wear and fracture at about the same rate as the portion of the tooth associated with the given cutting level wears away.

28. The tool of claim 27 wherein the teeth have a hardness of between 38 Ra and 42 Ra.

29. The tool of claim 28 wherein the grains have a relative strength index of at least one minute, as measured by the FEPA standard for determining the relative strength of saw diamonds.

30. The abrasive cutting tool of claim 1, wherein the tool is selected from the group consisting of saw blades, core drills and abrasive wheels.

31. The abrasive cutting tool of claim 25, wherein the tool is selected from the group consisting of saw blades, core drills and abrasive wheels.

* * * * *